United States Patent [19]

Hehn et al.

[11] Patent Number: 4,923,062
[45] Date of Patent: May 8, 1990

[54] INSERT IN COMBINATION WITH AUDIO CASSETTE SECURITY PACKAGES

[75] Inventors: Bruce A. Hehn; James T. Weisburn, both of Massillon, Ohio

[73] Assignee: Alpha Enterprises, Inc., East Canton, Ohio

[21] Appl. No.: 321,569

[22] Filed: Mar. 9, 1989

[51] Int. Cl.⁵ .............................................. B65D 1/36
[52] U.S. Cl. ................................. 206/387; 206/45.31
[58] Field of Search .............. 206/387, 1.5, 807, 45.14, 206/45.31

[56] References Cited

U.S. PATENT DOCUMENTS

| | | | |
|---|---|---|---|
| 3,272,325 | 9/1966 | Schoenmakers | 206/387 |
| 3,638,788 | 2/1972 | Solomon | 206/387 |
| 3,746,180 | 7/1973 | Sproch et al. | 206/387 X |
| 3,871,516 | 3/1975 | Holkestad et al. | 206/45.31 |
| 4,125,189 | 11/1978 | Fujimoto et al. | 206/387 |
| 4,240,551 | 12/1980 | Osanai | 206/387 |
| 4,285,429 | 8/1981 | MacTavish | 206/387 |
| 4,303,159 | 12/1981 | Stone et al. | 206/387 |
| 4,327,952 | 5/1982 | Cournoyer et al. | 206/387 X |
| 4,365,712 | 12/1982 | Oishi et al. | 206/387 |
| 4,381,836 | 5/1983 | Rivkin et al. | 206/387 |
| 4,385,693 | 5/1983 | Gelerdi et al. | 206/387 |
| 4,567,983 | 2/1986 | Morris | 206/387 |
| 4,589,549 | 5/1986 | Hehn | 206/387 |
| 4,634,004 | 1/1987 | Mortensen | 206/387 |
| 4,714,161 | 12/1987 | Thorud | 206/387 |
| 4,759,442 | 7/1988 | Greyerson et al. | 206/387 |
| 4,805,769 | 2/1989 | Soltis et al. | 206/1.5 X |
| 4,834,238 | 5/1989 | Hehn | 206/387 |

FOREIGN PATENT DOCUMENTS 0090766  5/1984  Japan .................................. 206/387

Primary Examiner—Bryon Gehnon
Attorney, Agent, or Firm—Michael Sand Co., L.P.A.

[57] ABSTRACT

An insert construction for receiving an audio cassette single which is generally contained in a cardboard sleeve and sealed in a clear heat-shrink wrapped plastic cover and which is smaller than the usual plastic case which houses the multiple play audio cassette, enabling the cassette singles to be safely stored and displayed in the security packages heretofore used for the larger plastic cases. At least one generally U-shaped cross-sectional channel is formed in the insert and has a width generally equal to the thickness of an the wrapped audio cassette single for trapping and retaining the cassette within the insert. When the audio cassette single is received in the insert, the dimensions of the insert or the combined insert and cassette enable the insert and cassette to be placed in the storage compartment of an audio cassette security package when the package is in the unlocked position, and prevent removal of the insert and cassette from the storage compartment when the security package is in the locked position. Certain embodiments of the insert can be injection molded in strip form and then bent into a final U-shape for receiving the wrapped cassette single. Certain embodiments contain ribs within the channels for positioning the cassette therein and enables the insert to achieve the required internal and external dimensions with a minimum volume of plastic.

8 Claims, 3 Drawing Sheets

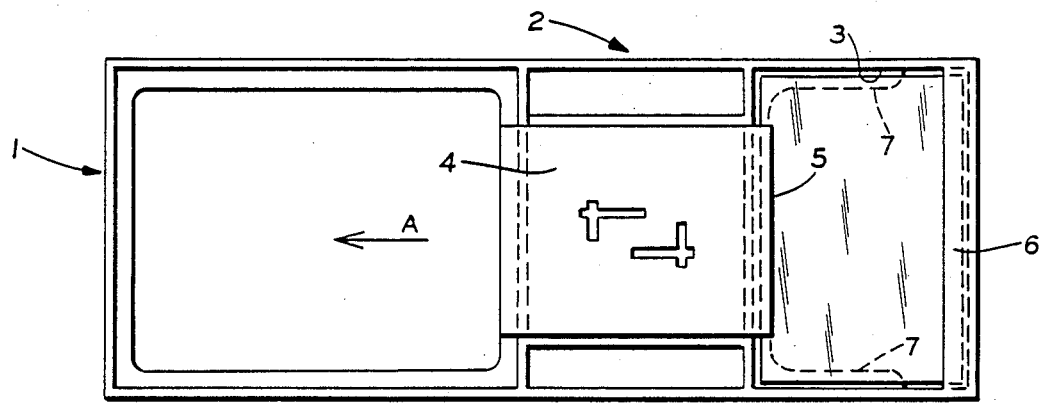
PRIOR ART FIG. 1
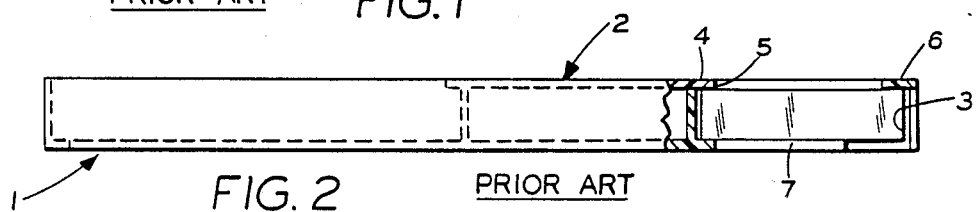
FIG. 2 PRIOR ART
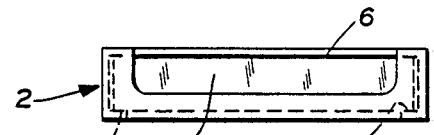
FIG. 3 PRIOR ART
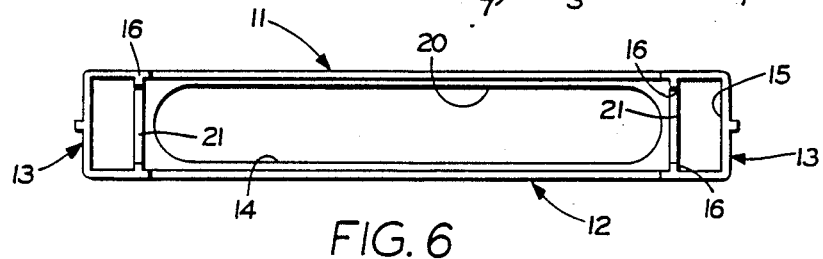
FIG. 6
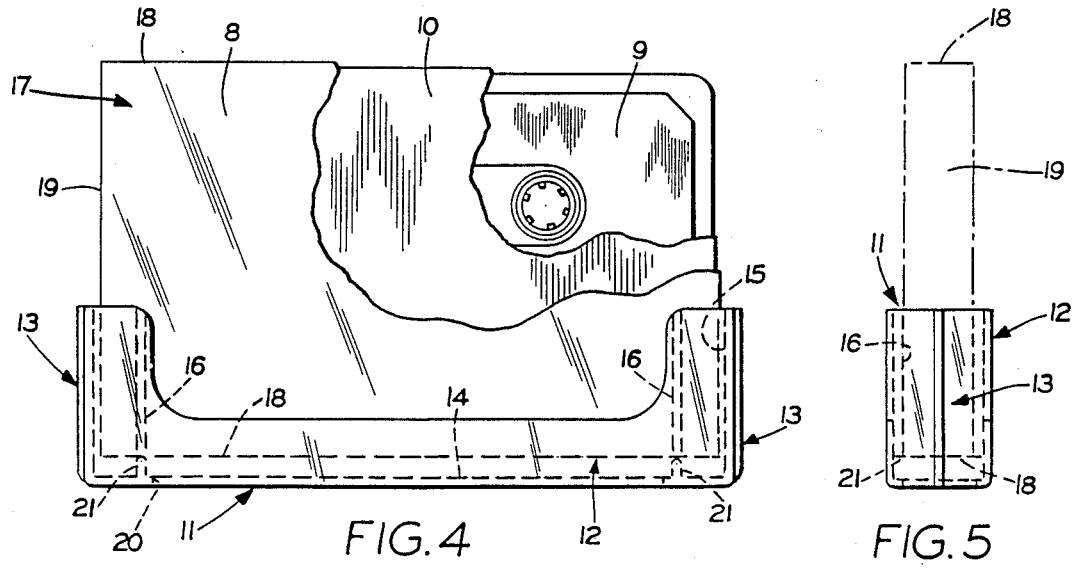
FIG. 4
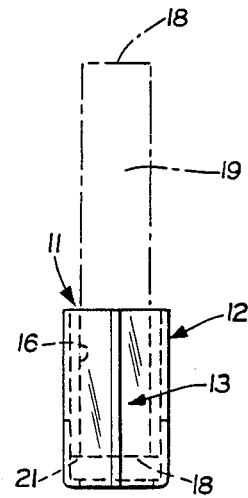
FIG. 5

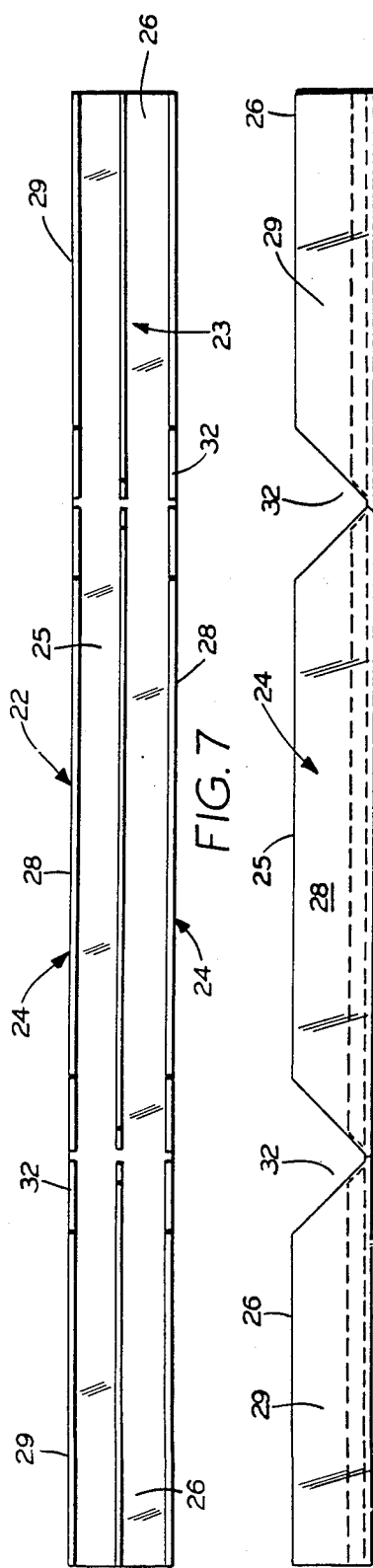
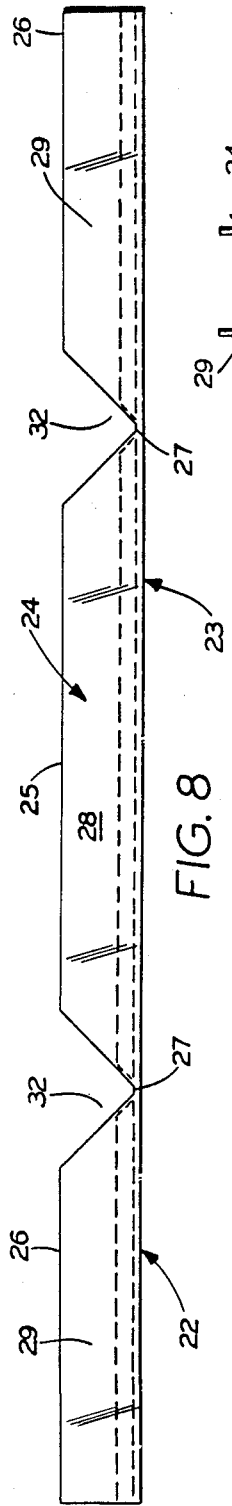
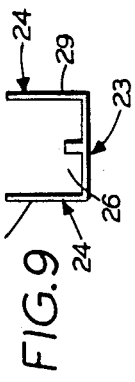
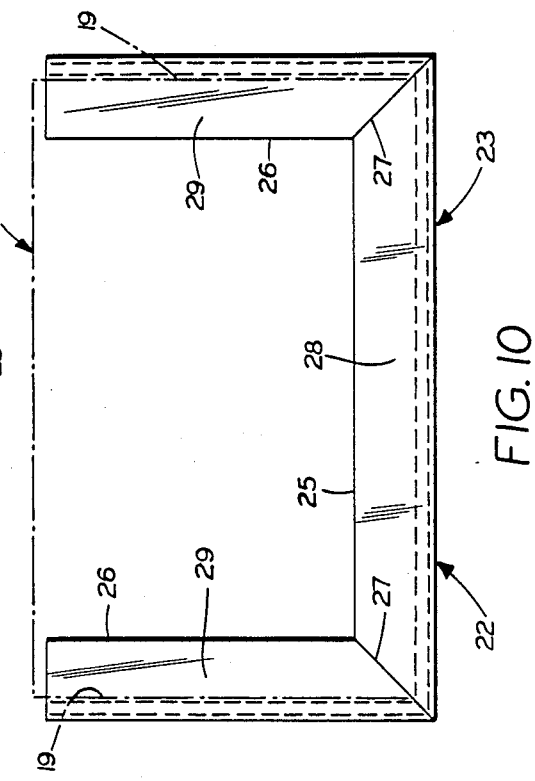
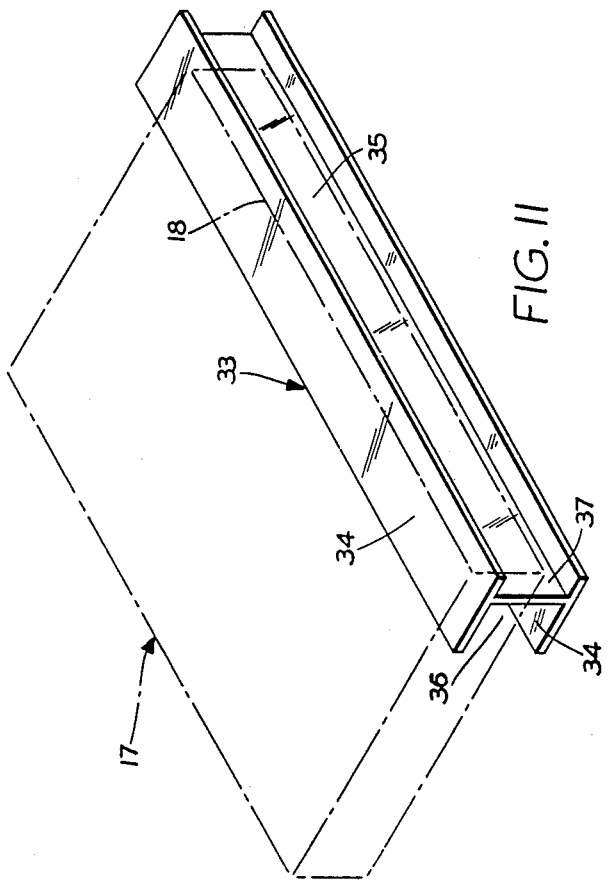

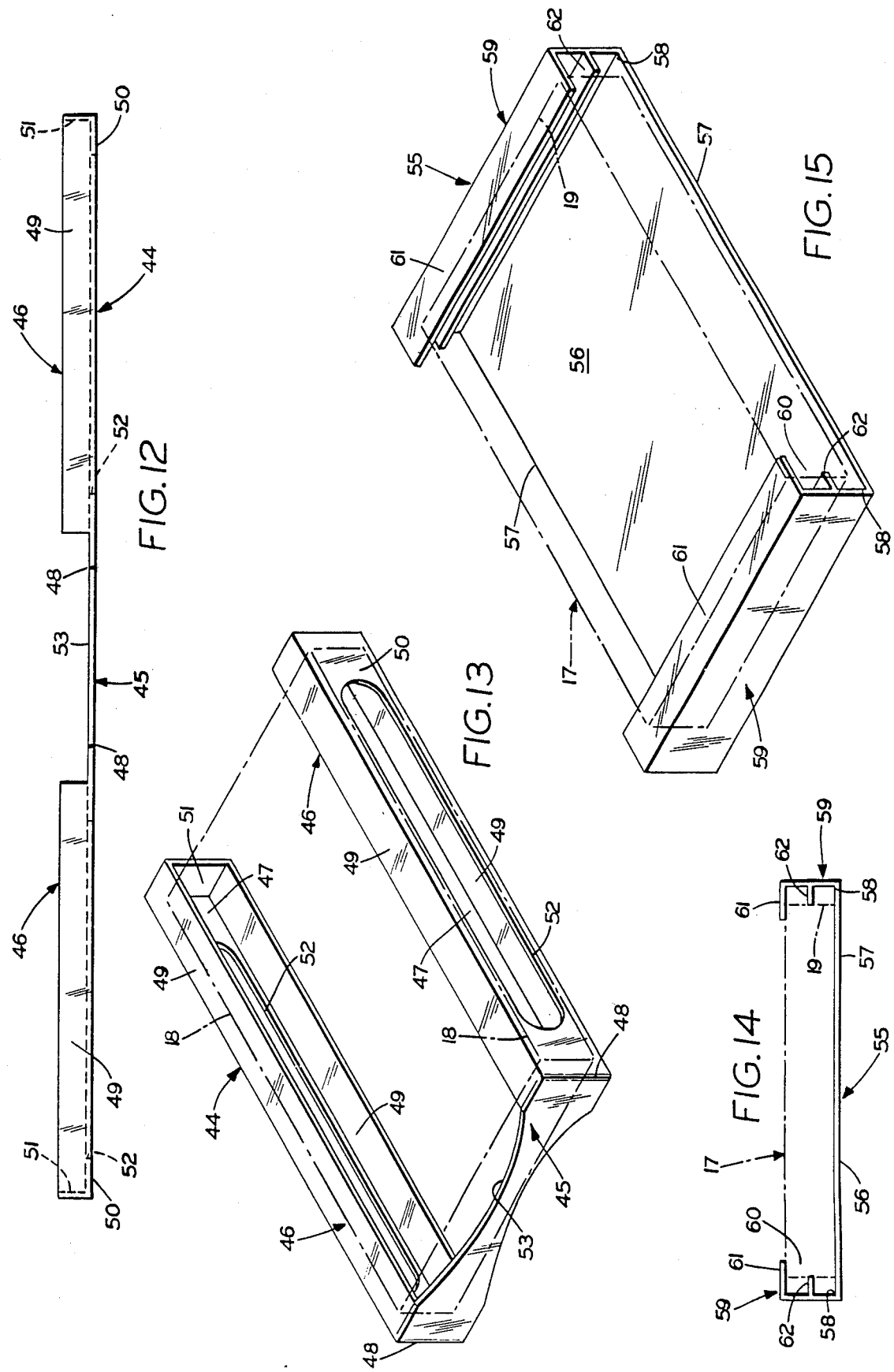

4,923,062

INSERT IN COMBINATION WITH AUDIO CASSETTE SECURITY PACKAGES

BACKGROUND OF THE INVENTION

1. Technical Field

The invention relates to an insert for securely retaining an audio cassette in a storage compartment of an audio cassette security package of the type adapted to receive the usual hinged plastic storage case cassettes. More particularly, the invention relates to a reusable insert for receiving an audio cassette of the type having only one selection on each side of the tape commonly referred to as a cassette single, which is packaged in a cardboard sleeve, so that the dimensions of the combined insert and cardboard sleeve containing the audio cassette, enable the insert and cassette to be placed in the storage compartment of an audio cassette security package when the package is in the unlocked position, and prevent removal of the insert and cassette from the storage compartment when the security package is in the locked position.

2. Background Information

In recent years, audio cassettes have become increasingly popular and now outsell usual L.P. record discs. The introduction of these audio cassettes into the marketplace presented a problem to retailers in that the cassettes, which are much smaller than the record discs and 8-track cassette tapes which were popular in the past, had to be displayed so that prospective purchasers could inspect the same to determine the artist, songs, etc. contained on the tapes. This presented a security problem due to the extremely small size of the cassettes in contrast to the record discs and 8-track tapes.

Record discs normally are placed on one of their edges and displayed in racks since theft of the discs is extremely difficult due to their large size, which is generally 12 inches. A popular manner of storing and displaying the nearly defunct 8-track tapes was to place the same in a storage cabinet having a plastic or glass front panel that was provided with a circular opening. A prospective purchaser could insert his or her hand through the opening and remove an 8-track tape from a horizontal storage shelf and inspect the same through the plastic or glass with respect to the recording artist and particular songs contained on the tape. The size of the opening in the transparent panel was too small to permit the 8-track tape to be removed through the opening, and an attendant was needed to unlock and open the storage cabinet to complete the sale of a tape.

The small size of the audio cassette made such methods of display difficult from a security standpoint, since the circular opening in the display rack had to be sufficiently large to enable a prospective buyer to insert a hand through the opening for manipulation of the cassette. Such an opening while permitting insertion of a hand, unfortunately also was large enough for an audio cassette to be removed theretrhough. Also, open rack display of audio cassettes in a manner similar to record discs was extremely vulnerable to theft problems.

Therefore, various types of security packages were devised to enable the audio cassettes to be displayed for sale vertically in usual record disc display racks, horizontally in usual 8-track display cases, or suspended from a display rack on hooks or pegs, while retarding removal of the cassette from the package and subsequent theft from the store. Examples of such packages are shown and described in U.S. Pat. Nos. 4,285,429; 3,871,516; 4,381,836; and 4,589,549. Another example is shown in pending application Ser. No. 07/117,310, now Pat. No. 4,834,238 which is assigned to the same assignee as in the present patent application.

These known audio cassette security packages do perform their intended function of enabling open display of the usual audio cassettes of the type which contain a plurality of selections on each side of the tape and which are usually packaged in the familiar hinged plastic case by the cassette manufacturer for shipment and subsequent placement in the various security packages. However those known security packages are not adapted for holding audio cassette singles, which are a recent development in the recording industry. More specifically, these cassette singles have the same dimensions as other multiple play audio cassettes, with the only difference being that cassette singles contain less magnetic tape so that only two songs are contained thereon, one on each side of the tape, as opposed to the several songs typically contained on each side of a normal audio cassette. These single cassettes are to normal audio cassettes what 45 record discs are to L.P. record discs.

These single cassettes are packaged in cardboard sleeves by the manufacturers, as opposed to the usual hinged plastic cases, to reduce cost. These sleeves have dimensions substantially smaller than the dimensions of the plastic cassette case, so that the storage compartments of the known audio cassette security packages are too large to securely hold and prevent removal of a cardboard sleeve-packaged single cassettes from the storage compartment when the security package is in a locked position. The storage compartment of such security packages has dimensions adapted to receive the familiar larger hinged plastic case in which multiple play audio cassettes are shipped to the retailer by manufacturers.

Therefore, the need exists for an insert to receive an audio single cassette which is packaged in a cardboard sleeve, whereby the insert and cassette assumes the overall size and configuration of the usual hinged plastic cases so that the insert and sleeved single cassette can be placed in a storage compartment of a usual multiple play audio cassette security package to enable the same storage and security package to be used for both types of cassettes.

SUMMARY OF THE INVENTION

Objectives of the invention include providing an insert for audio cassette security packages for receiving audio cassettes of the type known as cassette singles which are packaged in cardboard sleeves for placement in a storage compartment of an audio cassette security package of the type having locked and unlocked positions for receiving usual multiple play audio cassettes of the type packaged in the well-known hinged plastic cases.

Another objective of the invention is to provide such an insert for use with audio cassette security packages in which the dimensions of the combined insert and cardboard sleeve-packaged audio cassette enable the insert and cassette to be placed in the storage compartment of an audio cassette security package when the package is in the unlocked position, and which prevents removal of the insert and cassette from the storage compartment when the security package is in the locked position.

A further objective of the invention is to provide such a security package insert in which the insert is reusable, durable, inexpensive to manufacture, and when used in combination with a security package effectively deters theft of audio cassette singles from retail stores.

These objectives and advantages are obtained by the insert construction of the invention, adapted for receiving an audio cassette of the type being generally rectangular-shaped and flat, and having a pair of spaced parallel longitudinal edges and a pair of spaced parallel transverse edges, the insert further being adapted for placement in a storage compartment of an audio cassette security package of the type having locked and unlocked positions; the general nature of which may be stated as including an insert having at least one channel formed therein with a width generally equal to the thickness of an audio cassette, for receiving a selected one of a certain pair of the longitudinal and transverse edges of an audio cassette, so that the dimensions of the combined insert and audio cassette enable the insert and cassette to be placed in the storage compartment of an audio cassette security package when the package is in the unlocked position, and prevent removal of the insert and cassette from the storage compartment when the security package is in the locked position.

DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

FIG. 1 is a top plan view of a usual audio cassette security package of the type heretofore used for storing multiple play cassettes contained in a hinged plastic case, with the insert of the invention being contained therein;

FIG. 2 is a side elevational view, with portions broken away and in section, of the security package of FIG. 1;

FIG. 3 is a right-hand end elevational view of the security package of FIGS. 1 and 2;

FIG. 4 is a side elevational view of a first embodiment of the invention, with an audio cassette single cardboard storage sleeve being shown therein in a multiple breakaway arrangement;

FIG. 5 is a right-hand end elevational view of the insert of FIG. 4 with the storage sleeve being shown in dot-dash lines;

FIG. 6 is a top plan view of the security package insert of FIGS. 4 and 5 without the sleeve;

FIG. 7 is a top plan view of a second embodiment of the security package inesrt in an unfolded form prior to being folded into its final configuration;

FIG. 8 is side elevational view of the unfolded insert of FIG. 7;

FIG. 9 is an end elevational view of the insert shown in FIGS. 7 and 8;

FIG. 10 is a side elevational view of the insert of FIGS. 7-9, shown folded into its final configuration having an audio cassette single storage sleeve shown in dot-dash lines mounted therein;

FIG. 11 is a perspective view of a third embodiment of the security package insert of the present invention, with an audio cassette single storage sleeve being shown therein in dot-dash lines;

FIG. 12 is a side elevational view of a fourth embodiment of the security package insert in an unfolded form prior to being folded into its final shape;

FIG. 13 is a perspective view showing the insert of FIG. 12 folded into its final configuration, and holding an audio cassette single storage sleeve, shown in dot-dash lines;

FIG. 14 is an end elevational view of a fifth embodiment of the security package insert of the invention with the storage sleeve shown in dot-dash lines; and FIG. 15 is a perspective view of the insert of FIG. 14, holding the audio cassette single storage sleeve, shown in dot-dash lines.

Similar numerals refer to similar parts throughout the drawings.

DESCRIPTION OF THE PREFERRED EMBODIMENTS

One type of known audio cassette security package for receiving the cassette inserts of the invention is indicated generally at 1, and is shown particularly in FIGS. 1-3. The features and construction of security package 1 are shown and described in greater detail in U.S. Pat. No. 4,589,549 and are incorporated herein by reference. Package 1 illustrates one type of security package with which the insert of the present invention may be used.

Security package 1 includes a one-piece molded plastic unit that provides a housing, indicated generally at 2, having a cassette storage compartment 3 formed at one end thereof (FIGS. 1-3). In accordance with one of the features of security package 1, a locking device or slide plate 4 is slideably mounted on housing 2 for locking a usual multiple play audio cassette in storage compartment 3 and shown particularly in U.S. Pat. No. 4,589,549. More specifically, audio cassette manufacturers typically package each multiple play audio cassette in a high-impact rectangular plastic case which is well-known in the art, and which provides protection during shipment and storage of the cassettes. These audio cassette storage cases have dimensions significantly larger than the dimensions of a cassette, and slightly less than the dimensions of security package storage compartment 3.

Thus, a usual multiple play audio cassette contained in its plastic storage case can be placed in storage compartment 3 of security package 1, afterwhich slide plate 4 is moved to the locked position shown in FIGS. 1 and 2, to prevent removal of the audio cassette and case from the storage compartment until the cassette is removed by a sales clerk by use of a manually actuated key. More particularly, when slide plate 4 is in the locked position, a front edge 5 thereof projects into storage compartment 3 and overlaps one of the longitudinal edges of the cassette plastic storage case contained within the storage compartment. The opposite longitudinal edge of the cassette storage case is secured in storage compartment 3 by retaining flange 6, which in combination with a pair of bottom wall flanges 7 prevent unauthorized removal of the cassette from the security package. Slide plate 4 cannot be moved to the unlocked position, or in the direction of arrow "A" (FIG. 1), until unlocked by use of the key. Whereon front slide plate edge 5 is removed from locking engagement with the cassette case enabling the case to be easily removed from its stored position within storage compartment 3 by a store clerk for subsequent sale of the audio cassette contained therein.

One of the most recent developments in the recording industry is an audio cassette single 9 which is contained in a cardboard sleeve 10 and wrapped in a heat-shrink clear outer plastic film 8 (FIG. 4). These three components are hereinafter collectively referred to as cassette 17. The housing of an audio cassette single 9 is identical in size and shape to the housing of the multiple selection audio cassettes, with the only difference being the smaller amount of magnetic tape contained in the cassette single. However, cardboard sleeve 10 in which a cassette single is contained, is substantially smaller than the heretofore used hinged plastic cases in which multiple play audio cassettes are packaged. Thus, a cassette single 9 contained in a cardboard sleeve 10 is too small to be secured in the storage compartment 3 of an audio cassette security package which is adapted to hold multiple play audio cassettes packaged in the familiar larger plastic cases. Therefore, it is desirable that some means be provided to enable both the multiple and single play cassettes to be safely stored in the same size, shape and construction of security package. The insert of the present invention solves this problem, as described in detail below.

A first embodiment of the insert of the present invention is indicated generally at 11, and is shown particularly in FIGS. 4-6. Insert 11 is a generally U-shaped integral one-piece molded plastic member and includes a web wall indicated generally at 12, and a pair of spaced parallel sidewalls indicated generally at 13. Insert 11 can be injection molded of any suitable plastic material such as styrene or polypropylene. Web wall 12 and sidewalls 13, each are formed as U-shaped cross-sectional channels 14 and 15, respectively, with ribs being formed on the exterior of side walls 13. Channels 14 and 15 each has a width which is greater than the thickness of a wrapped cassette single 17.

Each audio cassette single 9 (FIGS. 4 and 5) when heat shrunk wrapped in its cardboard sleeve 10, is rectangular-shaped and relatively flat and has a pair of spaced parallel transverse edges 19. Web wall channel 14 is adapted to receive a selected one of the longitudinal edges 18 of the packaged cassette single 17, and each sidewall channel 15 is adapted to receive a portion of a respective one of the transverse edges 19 of cassette 17. The dimensions of the combined insert 11 and the packaged cassette single 17, enable the insert and cassette to be placed in storage compartment 3 of audio cassette security package 1 when the package is in the unlocked position, and prevent removal of the insert and cassette from the storage compartment when the security package is in the locked position shown in FIGS. 1 and 2.

A plurality of spaced parallel ribs 16 are formed integrally with sidewalls 13 of insert 11 and extend inwardly towards each other (FIG. 6) to provide strength to the insert and also provide for a snug fit of cassette 17 within the insert. The bottom longitudinal edge 18 of cassette 17 preferably is supported upon a pair of spaced parallel ribs 21 which are formed integrally with web wall 12. Also web wall 12 preferably is formed with an elongated opening 20 (FIG. 6) which reduces the amount of plastic required for molding insert 11, and also provides a window for viewing the printed indicia on the side of cardboard sleeve 10, identifying the artist, songs, etc. on the cassette. Ribs 16 and 21, in addition to providing rigidity to the insert walls enable less plastic to be used to provide insert 1 with the required outside dimensions for matching the interior of storage compartment 3 and provide the required interior dimensions for receiving wrapped cassette single 17.

A second embodiment of the insert of the invention is indicated generally at 22, and is shown in assembled form in FIG. 10 holding a single audio wrapped cassette 17. Insert 22 is a generally U-shaped integral one-piece plastic member and includes a web wall indicated generally at 23, and a pair of spaced parallel sidewalls indicated generally at 24. Insert 22 can be injection molded into its U-shaped form of FIG. 10, but preferably is formed of polypropylene and extruded into a continuous straight strip configuration shown in FIGS. 7-9, afterwhich it is folded into the U-shaped configuration of FIG. 10. This extension procedure is more economical then molding and enables insert 22 to be easily stored and shipped in this flat strip configuration prior to its use as an insert in a security package.

When ready to be inserted into a security package, insert 22 is folded about wrapped cassette 17 as shown in FIG. 10, and placed in storage compartment 3 of the security package. A hinge 27 is formed at a junction of each sidewall 24 with web wall 23 to provide for the ease of folding insert 22 from its continuous straight strip configuration into its U-shaped form. Hinge 27 is formed easily b forming V-shaped notches 32 in the spaced parallel side panels 28 and 29 which form web wall 23 and sidewalls 24.

U-shaped cross-sectional channels 25 and 26 are formed by spaced parallel panels 28 of web wall 23 and panels 29 of sidewalls 24, respectively. Web wall channel 25 is adapted to receive a selected one of the longitudinal edges 18 of a cassette 17, and sidewall channels 26 are adapted to receive generally the entire length of a transverse edges 19 of the cassette 17. The combined insert 22 and cassette 17 then is placed in storage compartment 3 of security package 1 for retail store display.

A third embodiment of the present invention is indicated generally at 33, and is shown in FIG. 11. Insert 33 is a generally I-shaped integral one-piece plastic member formed by a pair of spaced parallel side panels 34 and an intermediate connecting web 35 forming a pair of channels 36 and 37 U-shaped in cross-section. Insert 33 can be injection molded or extruded, and preferably is formed of clear P.V.C. plastic. U-shaped channel 36 is adapted to receive a selected one of the longitudinal edges 18 of cassette 17 for subsequent insertion of the insert and cassette into the storage compartment of a usual audio cassette security package as discussed previously. The longitudinal length of insert 33 is generally equal to the length of the usual hinged plastic case, and the combined height of insert 33 and cassette 17 is generally equal to the height of the case, so that insert 33 and cassette 17 matches the interior of storage compartment 3 of security package 1. The distance between the outer surface of spaced side panels 34 is generally equal to the thickness of the plastic storage case.

A fourth embodiment of the insert of the present invention is indicated generally at 44, and is shown particularly in FIGS. 12 and 13. Insert 44 when in assembled condition (FIG. 13), has a generally U-shaped configuration and is formed from an integral one-piece plastic member. Insert 44 includes a web wall indicated generally at 45, and a pair of spaced parallel sidewalls, each of which is indicated generally at 46. Insert 44 preferably is injection molded and preferably is injection molded in the flat strip configuration of FIG. 12, formed of polypropylene.

A generally U-shaped cross-sectional channel 47 is formed in each sidewall 46 by spaced parallel side panels 49 and a connecting panel 50. The outer ends of each sidewall 46 is closed by a reinforcing end panel 51. A respective longitudinal edge 18 of cassette 17 is received within each channel 47 as shown in FIG. 13. A hinge 48 is formed adjacent the junction of each sidewall 46 with web wall 45 for folding the extruded strip of material into the U-shaped configuration of insert 44. Insert 44 is molded in a continuous straight strip configuration shown in FIG. 12 for easy storage and shipment prior to folding into its U-shaped form for use as a security package insert. Insert 44 is foldable at hinges 48 into the U-shaped configuration wherein sidewall channels 47 capture longitudinal edges 18 of cassette 17 for subsequent insertion of the insert and cassette into the storage compartment of a security package.

Web wall 45 preferably is a flat strip of material and may have concave edges 53 to increase the visibility of the printed indicia of the stored cassette. Also connecting sidewall panels 50 preferably have elongated windows 52 formed therein, for increasing the visibility of the cassette contained therein as well as reducing the volume of plastic needed for molding the insert.

Thus the outer configuration of insert 44 generally conforms to the shape and size of the hinged plastic case and securely traps and retains cassette 17 therein for subsequent placement in storage compartment 3 of security package 1.

A fifth embodiment of the insert of the invention is indicated generally at 55, and is shown in FIGS. 14 and 15. Insert 55 is an integral one-piece plastic member and includes a rectangular-shaped flat web 56 which has a length and width generally equal to the length and width of a hinged plastic storage case. Flat wall 56 has a pair of spaced parallel longitudinal edges 57 and a pair of spaced parallel transverse edges 58. Insert 55 can be injection molded or extruded, and preferably is formed of polypropylene.

A pair of spaced, parallel and opposed F-shaped sidewall members indicated generally at 59 (FIG. 14), are formed along and extend perpendicularly from transverse edges 58 of flat wall 56. A generally U-shaped cross-sectional channel 60 is formed between the longer leg members 61 of each F-shaped member 59 and flat wall 56, for receiving transverse edge 19 of cassette 17 for retaining the cassette therein for subsequent placement into the storage compartment of a security package to prevent theft of the cassette single from a retail store display. The shorter legs 62 of sidewall members 59 assist in trapping and positioning cassette 17 within channels 60 and provide the desired interior size to insert 55 for holding cassette 17 therein, while enabling the outer dimension of insert 55 to match that of plastic case without requiring excessive volumes of plastic for molding the insert.

Again, the important feature of the various embodiments of the insert of the present invention is that the insert receives and traps therein audio cassettes of the type packaged in a cardboard sleeve so that the dimensions of the insert or the combined insert and audio cassette, enable the insert and cassette to be placed in the storage compartment of an audio cassette security package designed to receive cassettes packaged in the familiar larger hinged plastic cases, thus effectively deterring theft of cardboard sleeve-packaged audio cassette singles from retail store displays when packaged in the same security packages for the multiple play cassettes. Consequently, retail store owners need not purchase specially designed audio cassette security packages having storage compartments sized to receive the smaller cardboard sleeve-packaged cassette singles, but rather can utilize their supply of security packages intended for use with the plastic case-packaged cassettes for displaying the cassette singles.

In summary, the insert for audio cassette security packages of the present invention is reusable, durable, inexpensive to manufacture and easy to use, and most importantly deters theft of audio cassettes, and in particular cardboard sleeve-packaged cassette singles, from display areas in retail stores.

Accordingly, the insert of the present invention is simplified, provides an effective, safe, inexpensive, and efficient construction which achieves all the enumerated objectives, provides for eliminating difficulties encountered with prior constructions and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the insert for audio cassette security packages is constructed and used, the characteristics of the construction, and the advantageous, new and useful results obtained; the new and useful structures, devices, elements, arrangements, parts, and combinations, are set forth in the appended claims.

We claim:

1. In combination, a cassette security package and insert means for holding a cassette whereby said insert means and cassette when placed in a storage compartment of the security package prevents removal of the cassette from said compartment, wherein said compartment is formed by a plurality of spaced members forming a plurality of openings for viewing the cassette within the storage compartment and wherein at least one of said openings is sufficiently large to permit the cassette to be removed therethrough unless held in said insert means; said insert means being a one-piece U-shaped plastic member having a web wall and a pair of spaced parallel sidewalls, said web wall and sidewalls being U-shaped in cross-sectional configuration and forming channel means for trapping a longitudinal edge of the cassette and at least portions of adjacent transverse edges of said cassette therein; and an elongated opening formed entirely in the web wall for viewing portions of the longitudinal edge of the cassette adjacent to and trapped within said web wall.

2. The combination defined in claim 1 in which rib means extend into the channel means for engaging the cassette received therein.

3. The combination defined in claim 2 in which the rib means includes a pair of spaced ribs formed on the web wall, each of which is located adjacent the elongated opening.

4. The combination defined in claim 3 in which the rib means further includes two pair of spaced ribs formed on and extending along the side walls in alignment with the ribs formed on the web wall.

5. The combination defined in claim 1 in which the security package includes lock means slideably mounted for movement across an access opening between locked and unlocked positions for releasably securing the cassette and insert means in the storage compartment.

6. The combination defined in claim 5 in which the external size and configuration of the combined insert means and cassette held thereby is complementary to the interior of the storage compartment.

7. The combination defined in claim 1 in which ribs are formed on an exterior of the sidewalls.

8. The combination defined in claim 1 in which the sidewalls of the insert means extend along portions of the transverse edges of the cassette less than one-half of the length of said transverse edges.

* * * * *